United States Patent [19]

Dyott et al.

[11] 4,181,515

[45] Jan. 1, 1980

[54] METHOD OF MAKING DIELECTRIC OPTICAL WAVEGUIDES

[75] Inventors: Richard B. Dyott; John L. Stevenson, both of London, England

[73] Assignee: The Post Office, London, England

[21] Appl. No.: 844,295

[22] Filed: Oct. 21, 1977

Related U.S. Application Data

[62] Division of Ser. No. 614,764, Sep. 18, 1975, Pat. No. 4,077,699.

[30] Foreign Application Priority Data

Sep. 24, 1974 [GB] United Kingdom ............... 41598/74

[51] Int. Cl.² ...................... C03C 25/02; C03B 32/00; C01B 27/00
[52] U.S. Cl. ...................... 65/3 A; 65/3 R; 65/32; 65/33; 156/616 R; 156/617 H; 260/707; 350/96.14; 156/617 V
[58] Field of Search ............ 65/3 A, 3 R, 59 A, 59 B, 65/33, 32; 156/619, 624, 600, 603, 608, 615, 616 R, 617 H, DIG. 96, 617 V; 260/707; 350/96.14

[56] References Cited

U.S. PATENT DOCUMENTS

| | | | |
|---|---|---|---|
| 1,793,529 | 2/1931 | Taylor | 65/59 A X |
| 3,227,032 | 1/1966 | Upton | 65/3 A X |
| 3,362,803 | 1/1968 | Dannohl et al. | 65/3 A X |
| 3,479,168 | 11/1969 | Bird et al. | 65/3 A |
| 3,481,390 | 2/1969 | Veltri et al. | 65/3 A X |
| 3,607,137 | 9/1971 | Inoguchi et al. | 156/616 R X |
| 3,615,203 | 10/1971 | Kaneko et al. | 156/616 A X |
| 3,653,863 | 4/1972 | Araujo et al. | 65/3 R X |
| 3,785,718 | 1/1974 | Gloge | 65/3 A X |
| 3,960,647 | 6/1976 | Faure et al. | 156/603 |
| 4,060,401 | 11/1977 | Maries et al. | 65/33 |

*Primary Examiner*—S. Leon Bashore
*Assistant Examiner*—Frank W. Miga
*Attorney, Agent, or Firm*—Kemon & Estabrook

[57] ABSTRACT

An opto-electronic element consists of a dielectric optical waveguide having a single crystal core of meta-nitroaniline. The element is made by feeding molten meta-nitroaniline into a hollow fibre along which a temperature gradient exists. Nucleation sets in at one end of the fibre and the temperature gradient is altered to promote crystal growth along the fibre. The element can be used as a polarizer, in isolators, harmonic generators or mixers. The action of the device depends on either the non-linear optical properties of the meta-nitroaniline or the optical anisotropy of the meta-nitroaniline. To make a polarizer the meta-nitroaniline core is surrounded by a cladding having a refractive index lying midway between two of the refractive indices of the meta-nitroaniline.

9 Claims, 5 Drawing Figures

METHOD OF MAKING DIELECTRIC OPTICAL WAVEGUIDES

This is a division, of application Ser. No. 614,764, filed Sept. 18, 1975, now U.S. Pat. No. 4,077,699 issued Mar. 7, 1978.

The present invention relates to opto-electronic devices, and to a dielectric optical waveguide unit for use in such devices.

In order to construct an optical communications system it is desirable to have devices such as isolators, harmonic generators, and mixers etc. Some of these devices are already known for solid state optical communications systems, however, they employ a basic slab waveguide structure. Devices of this type are basically incompatible with dielectric optical waveguides which have a cylindrical structure. Since dielectric optical waveguides with low loss are without exception cylindrical in form, this makes it hard to envisage the use of known devices in a practical optical communications system. In addition since the number of the devices referred to above depend on non-linear optical effects it is important to have high energy densities generated in these devices.

The present invention is concerned with an element which has a basic cylindrical structure and may be employed in the construction of the devices referred to above. This enables opto-electronic devices which are compatible with cylindrical dielectric optical waveguides to be constructed. In addition the cylindrical symmetry gives much higher power densities than are obtained with slab structures and thus enhances non-linear effects. Furthermore, it is difficult to fabricate rectangular dielectric optical waveguides, i.e. slab structures, to produce single mode dielectric optical waveguide geometries. With cylindrical structures this represents no problem.

According to a first aspect of the present invention there is provided a dielectric optical waveguide polariser comprising a length of dielectric optical waveguide having a single crystal cylindrical core of an optically anisotropic material having a first and a second refractive index surrounded by a cladding having a fourth refractive index greater than said first refractive index and less than said second refractive index, arranged so that light having a first plane of polarisation is guided by said length of dielectric optical waveguide, and light having a second plane of polarisation is radiated by said length of dielectric optical waveguide.

According to a second aspect of the present invention there is provided a method of making a dielectric optical waveguide element having a cladding and a single crystal core comprising feeding a core material in a molten form into a tube of a cladding material along which a temperature gradient is established said temperature gradient extending both above and below the temperature at which said core material melts, such that said material nucleates at a point in said tube, and changing said temperature gradient along said tube so that said molten material solidifies as a single crystal.

According to a third aspect of the present invention there is provided an optical mixer comprising a length of dielectric optical waveguide having a single crystal cylindrical core of a material having a non-centro-symmetric crystal structure and a cladding, and optical input means for coupling two distinct optical signals into said length of dielectric optical waveguide.

According to a fourth aspect of the present invention there is provided light detecting apparatus comprising a second harmonic generator consisting of a length of dielectric optical waveguide having a single crystal cylindrical core of a material having a non-centro-symmetric crystal structure and a cladding, said length of dielectric optical waveguide having a first end optically coupled to a source of radiation of a predetermined wavelength and a second end optically coupled to a light sensitive element, sensitive to a second harmonic of said predetermined wavelength.

According to a fifth aspect of the present invention there is provided a dielectric optical waveguide isolator comprising a first length of dielectric optical waveguide having a core and a cladding said core comprising an optically anisotropic single crystal having first and second refractive indices in first and second perpendicular directions, said first and second directions being perpendicular to the axis of said dielectric optical waveguide, said first refractive index greater than said cladding refractive index and said second refractive index less than said cladding refractive index, a second length of dielectric optical waveguide having a core and a cladding, said core comprising a Faraday magneto optic material arranged to rotate a plane of polarisation by $(2n+1)\times 45°$, where n is an integer, said first and second length of dielectric optical waveguide being optically coupled.

Embodiments of the invention will now be described by way of example with reference to the accompanying drawings in which.

Figure 1:
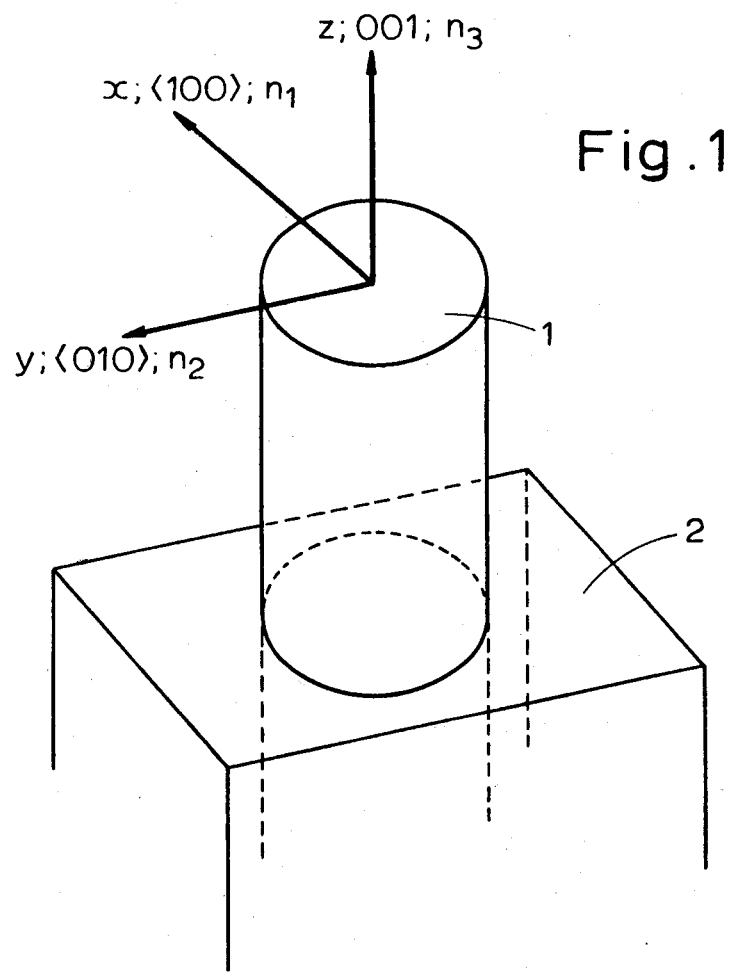
FIG. 1 shows an exploded view of an element used in the invention.

The devices with which the invention is concerned can be split into two classes. Firstly those devices which are intended to utilise non-linear optical effects and secondly those devices which depend for their operation on anisotropic optical properties. One form of the invention which can be used to provide either non-linear effects or optically anisotropic effects consists of a section of dielectric optical waveguides having a core 1 and a cladding 2. The core consists of a single crystal of meta-nitroaniline. The cladding consists of glasses from either the LaF or SF series of Schott optical glasses. The single crystal of meta-nitroaniline has its crystal axes arranged as shown in FIG. 1 of the drawing. $<001>$, $<010>$, $<100>$ denote the crystal axes by the conventional notation. If $n_1$, $n_2$, and $n_3$, are the refractive indices of the meta-nitroaniline crystal in the three directions indicated, and $n_c$ is the refractive index of the cladding glass, then the refractive indices are arranged so that $$n_1 > n_c > n_2 > n_3$$

in the red and near infra-red spectral regions.

The device shown in FIG. 1 is made by first machining a tubular preform of high refractive index ($n_D$ of the order of 1.65) optical glass. The preform has a rectangular external section and a cylindrical bore. This preform is then drawn down to form an optical fibre by a conventional technique. It is worth noting that during the pulling process a decrease in the refractive index of the glass may be observed. The cross-section of the preform is maintained in the fibre, and core diameters of less than 10 microns which corresponds to very fine capillary bores can easily be obtained by the use of this technique.

Figure 3:
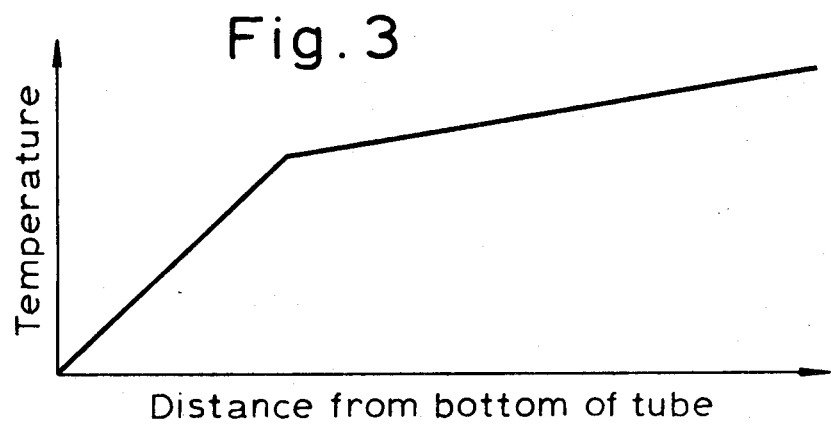
FIG. 3 shows the temperature gradient along the furnace in FIG. 2.
Figure 2:
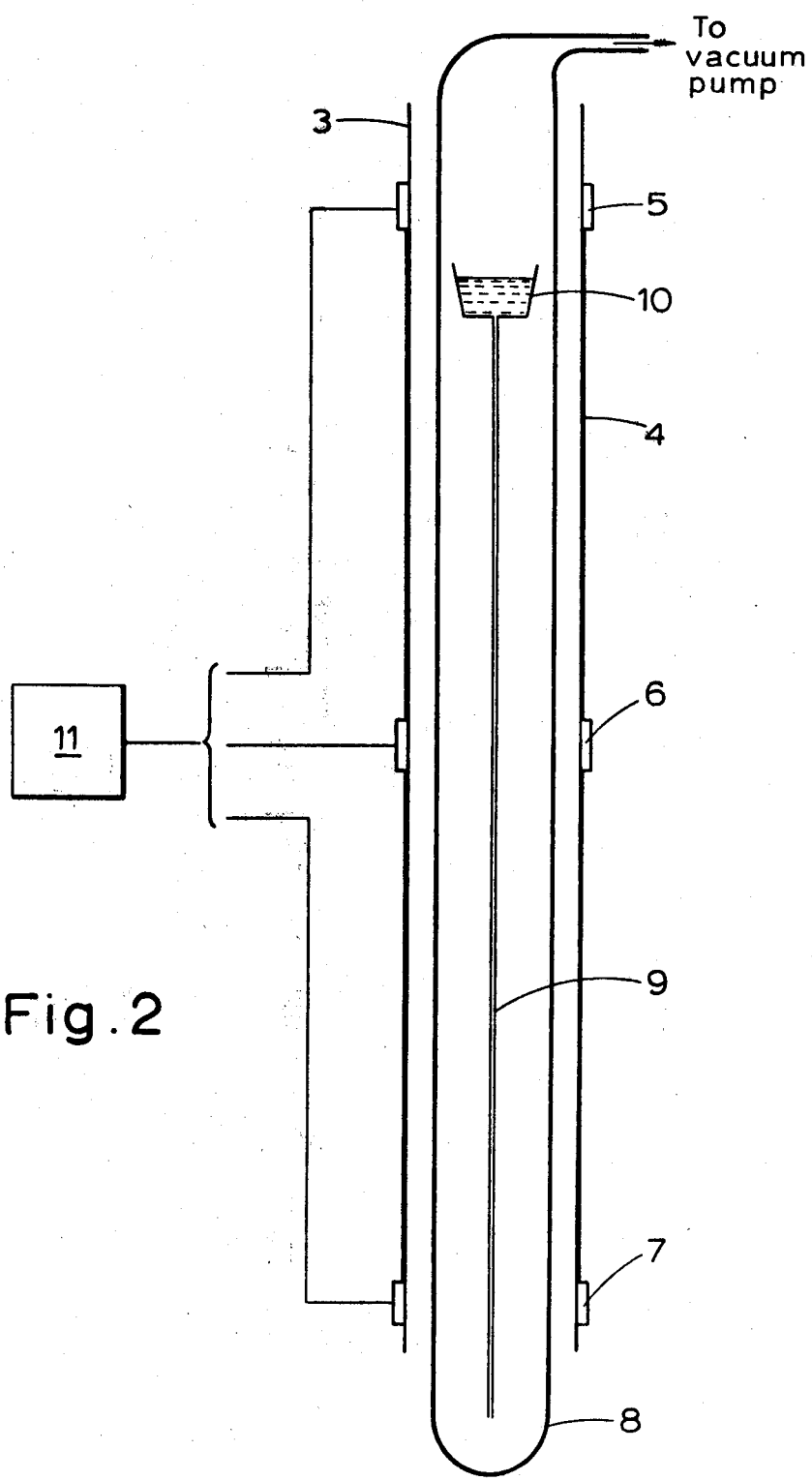
FIG. 2 illustrates diagrammatically apparatus for making elements used in the invention.

The fibre thus formed is filled with meta-nitroaniline in the apparatus shown in FIG. 2. This apparatus consists of a glass furnace tube 3 coated with a conductor 4 which may be tin oxide. Electrode connections are made at 5, 6 and 7 in the form of annular copper rings. Inside the furnace an evacuated tube 8 is positioned. Within the evacuated tube 8 a length, typically 450 mm, of drawn fibre 9 is arranged, connected to a small vessel 10 filled with meta-nitroaniline. When the furnace is heated up the meta-nitroaniline melts and flows into the fibre. A vertical temperature gradient exists along the furnace as shown in FIG. 3. As the meta-nitroaniline flows down the fibre it slowly super cools. Eventually it reaches a point in the fibre at which further super cooling is impossible and so nucleation of the meta-nitroaniline occurs. In order to assist the further crystalisation of the meta-nitroaniline the temperature gradient along the tube is altered so that the temperature slowly decreases. The room temperature resistance of each of the two zones of the furnace, i.e. between electrodes 5 and 6 and between electrodes 6 and 7 is 112 ohms. To obtain a temperature of 112° C. i.e. the melting point of meta-nitroaniline 0.152 w/cm$^2$ must be supplied to the heating element in free air. The surface area of each of the furnace zones is 760 square centimeters, hence a voltage of 114 volts must be supplied in order to produce the necessary heating power. During the actual growing process the pressure inside tube 8 is of the order of 5 torr and a voltage of 100 volts is applied across the bottom zone of the furnace and 120 volts across the top zone of the furnace. The bottom zone of the furnace is then cooled by reducing the applied voltage at a rate of 0.5 volts per minute, the top zone of the furnace is also cooled by reducing the applied voltage at the rate of 0.33 volts per minute. The typical time for a single crystal to grow the full length of the fibre is 60 minutes. Typical growth rates may be of the order of 0.75 centimeters per minute. A rate of 1 centimeter per minute is never exceeded after the initial nucleation is completed. The crystal needs to be grown under vacuum conditions to prevent the formation of air inclusions in the core of the finished dielectric optical waveguide. In the embodiment described above the molten meta-nitroaniline is fed into the fibre by gravity. However the liquid might also be fed into the fibre by capillary action. The temperature of the furnace is controlled by means of variacs 11, and the inner tube 8 is evacuated by a rotary vacuum pump not shown.

The principal physical defect within the fibres is caused by voids lying between the crystal and the glass forming the cladding of the dielectric optical waveguide. These voids are probably caused by the large decrease in volume (calculated to be 12.8% of the eventual solid volume of the meta-nitroaniline) which accompanies the solidification of the meta-nitroaniline. There are however no observable major crystallographic defects within the core, single crystal orientation being maintained over lengths of 200 mm. It is found that the crystals always tend to grow with the orientation indicated in FIG. 1. It should be noted that the rectangular shape of the dielectric optical waveguide tube causes an anisotropic pattern of heat flow out of the meta-nitroaniline core during the growth of the core. It is believed that this anisotropic heat flow pattern stabilises the crystal structure so that the <010> axis points to the thicker wall and the <100> axis points to the thinner wall. This process enables control over the orientation of the crystal within an asymmetric tube by control of thermal gradients should this be necessary. Using meta-nitroaniline the natural thermal gradients gives the preferred orientation.

Although meta-nitroaniline is the material in respect of which this invention is particularly described it should be realised that a large number of materials may be used. For example any material having a non-centrosymmetric crystal structure with a suitable melting point may be used where the non-linear optical properties of the core are to be exploited. A number of such substances are described in our United Kingdom Pat. No. 1,331,228. It should be emphasised that a single crystal core is necessary even with the non-linear devices because any inhomogeneity within the core causes a high scatter loss. Such a loss is unacceptable in optical communications systems. Furthermore these devices may depend for their operation on a strict geometric relationship between the anisotropy of linear and non-linear optical properties of the core with respect to the optical propagation direction of the fibre. This requirement is satisfied by using a single crystal core.

If the device is to exploit the optical polarisation properties of the core then any material having a suitable melting point and forming an optically anisotropic crystal may be used. In this connection it should be noted that meta-nitroaniline is a bi-axial crystal, and that generally this is preferable, however materials having an uniaxial indicatrix may also be successfully used. Some of the devices which can be constructed in the element illustrated in FIG. 1 of the accompanying drawings will now be described. First of all we will deal with passive devices utilising the optially anisotropic property of the core. A geometric optics treatment shows that optical guidance will be allowed for rays in the optical axial section where the intersection of the wave vector surface is:

$$\frac{\beta_x^2}{\eta_3^2} + \frac{\beta_z^2}{\eta_1^2} = \beta_0^2$$

(for TM wave only) and, in the perpendicular section where $$\frac{\beta_y^2}{\eta_1^2} + \frac{\beta_z^2}{\eta_1^2} = \beta_0^2$$

(for TE wave only). More concisely, the guidance is therefore limited to an input polarisation parallel to the optic axial section (crystallographic <010>). By putting $n_1 = 1.760$, $n_3 = 1.670$, and $\beta_z = 2\pi n_c/\lambda_o$, with $n_c = 1.729$ for Schott LaF N7 glass all at a wavelength, $\lambda_o$, of 633 nm, it can be shown by calculation that the numerical apertures are 0.30 for the TM ray and 0.32 for TE ray. It should be noted that at this wavelength and with fibres having core diameters of between 8 microns and 25 microns we are specifically dealing with multimode waveguides. By using glasses other than those referred to in this specification it should be possible to obtain refractive indices for the cladding which will permit mono-mode operation in this diameter range. Because of the choice of refractive indices, i.e. $n_1$ greater than $n_c$ and $n_c$ greater than $n_2$ light having a plane of polarisation in one direction will be guided by the structure and light having a plane of polarisation perpendicular to this will not be guided. This means that the element will act as a polariser. Typically extinction ratios of greater than 50 dB can be obtained at 633 nm.

By exploiting the polarising action of the meta-nitroaniline cored dielectric optical waveguide it is possible to construct an optical isolator. This is a device which will permit light to propagate in one direction along the dielectric optical waveguide, but will prevent the propagation in the reverse direction of back scattered or reflected radiation. Such a device consists of two elements, 12 and 13. Element 12 consists of a dielectric optical waveguide having a meta-nitroaniline core as previously described and acting as an optical polariser. Element 13 consists of a dielectric optical waveguide having a core of a Faraday magneto optic material in a longitudinal magnetic field.

The magnetic field intensity H is adjusted so that light propagating through element 13 has its plane of polarisation rotated by an angle of $\frac{1}{2}(2n+1)\,90°$, where n is 0 or an integer. In this way radiation which traverses element 13 in both directions is rotated by $(2n+1)\,90°$ and therefore radiated in element 12.

The second class of devices in which an element according to the present invention may be employed, are those depending on the non-linear optical properties of the core material e.g. mixers and harmonic generators.

In order to utilise a dielectric optical waveguide having a core of meta-nitroaniline and a glass cladding as a second harmonic generator, it is only necessary to feed high intensity radiation from a suitable source e.g. a neodymium ion laser (producing radiation at a wavelength of 1.06 microns) into the element. The emerging radiation will then contain the second harmonic of the incident radiation (at a wavelength of 0.53 microns). This type of optical second harmonic generator is particularly efficient because:

(a) waveguide dispersion can be used to phase match the fundamental input and second harmonic output by choice of the correct glass cladding (Schott SF 10), (b) a small cross-sectional area of the waveguide core means that high power densities can be generated internally from neodymium lasers of modest output power level, (c) the optical non-linearity responsible for second harmonic generation is inherent in the meta-nitroaniline core by virtue of crystallographic non-centro-symmetry and by correct choice of polarisation of the input fundamental beam, the largest coefficient of non-linearity can be made active.

It is the last feature (c) which is unique to the single crystal cored optical fibre waveguide—and as such represents a major advance on prior art techniques. In (a) and (b) too, the advantages of using a non-linear material in a cylindrical form present a significant improvement above what has been achieved with second harmonic generators in rectangular slab waveguide geometries. One use of an efficient simple harmonic generator fibre element in a fibre optical communications systems would be as an offset for any disadvantageous wavelength response at the detector (for example the silicon avalanche photo-diode has only a moderate quantum efficiency for detection of the neodymium laser wavelength). Thus if a particular detector is not sensitive to the radiation propagating along a dielectric optical waveguide, but is sensitive to the second harmonic of that radiation, a second harmonic generator can be optically coupled to the detector to enable it to function efficiently.

Figure 4:
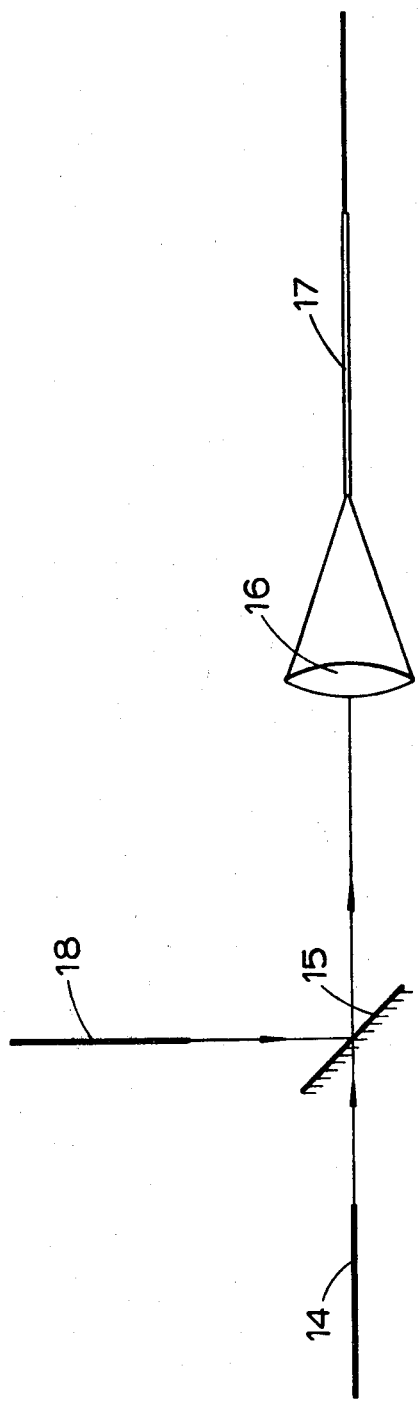
FIG. 4 illustrates an optical mixer.
Figure 5:
FIG. 5 illustrates an optical isolator.

To obtain mixing the apparatus shown in FIG. 4 may again be used. Radiation having the two frequencies to be mixed is fed into the apparatus via dielectric optical waveguides 14 and 18, and radiation having the mixed frequency emerges from the non-linear device 17. Again the optical non-linearity, this time responsible for the mixing, is inherent in the meta-nitroaniline core, by virtue of crystallographic non-centro-symmetry; and by correct choice of polarisation of the input fundamental beam the largest coefficient of non-linearity can be made active.

What we claim is:

1. A method of making a dielectric optical waveguide element having a cladding and a single crystal core comprising feeding a core material in molten form into a very fine capillary fiber of a cladding material along which a temperature gradient is established, said temperature gradient extending both above and below the temperature at which said core material melts, such that said material nucleates at a point in said fiber, and cooling said fiber so that said molten material solidifies as a single crystal.

2. A method as claimed in claim 1 wherein said temperature gradient is greater over a first region of said fiber remote from that end of said fiber into which said core material is fed, than said temperature gradient over a second region of said fiber, located between said end and said first region.

3. A method as claimed in claim 1 wherein said fiber is evacuated prior to feeding said molten core material into said fiber.

4. A method as claimed in claim 2 wherein said fiber is evacuated prior to feeding said molten core material into said fiber.

5. A method as claimed in claim 1 wherein there is a circumferential temperature gradient about an interior wall of said fiber.

6. A method as claimed in claim 1 wherein the molten core material is gravity fed into said fiber.

7. A method as claimed in claim 1 wherein the molten core material is fed into said fiber by capillary action.

8. A method as claimed in claim 1 wherein said crystal core grows from the molten core material at a rate of less than 1 centimeter per minute.

9. A method as defined by claim 2 wherein said first region is cooled at a slower rate than said second region.

* * * * *